Patented Nov. 23, 1937

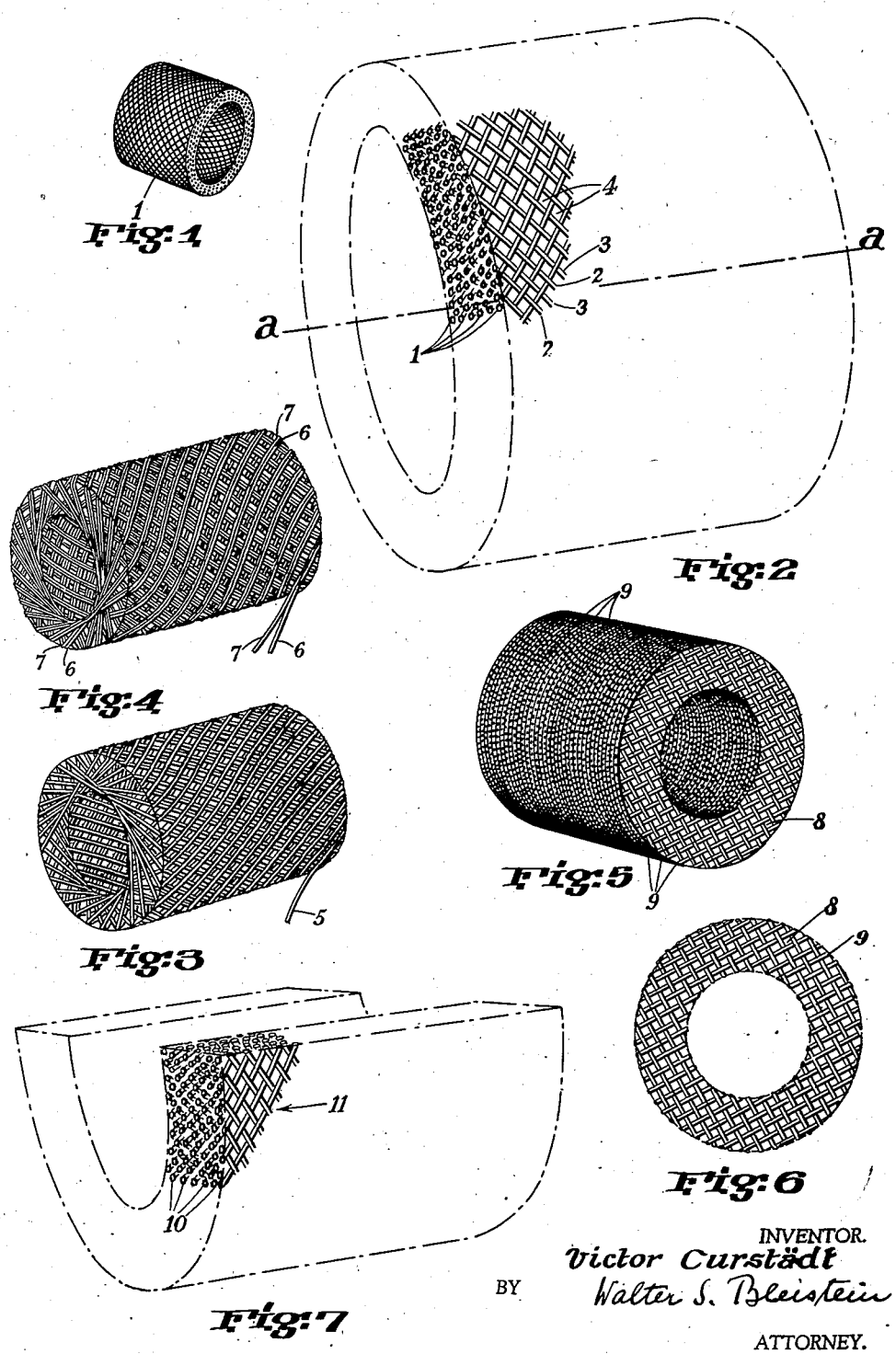

2,100,159

UNITED STATES PATENT OFFICE 2,100,159

POROUS BUSHING FOR BEARINGS AND METHOD FOR MAKING SAME

Victor Curstädt, Berlin, Germany, assignor of one-fourth to Georg H. Hirsch, New York Application May 21, 1936, Serial No. 80,962
In Germany November 23, 1934

6 Claims. (Cl. 29—149.5)

The present invention relates to a porous bushing for bearings, particularly for use in self-lubricating bearings, and to a method for making same.

My invention has for an object to provide a bushing of the above named kind which is easy in manufacture, and has great stability, and which is free of many of the drawbacks of the porous bushings hitherto known.

The invention consists in a bushing made of wires crossing each other and being arranged in several layers, bonded together and pressed in the shape of the bushing.

The invention furthermore consists in a process for making such bushings of intertwined wires either by forming them of a wire network or by spooling a continuous wire on a mandrel.

Other objects and details will be more clearly disclosed in the following description of my invention.

According to my invention, a wire netting is wound on a mandrel of suitable diameter in so many layers as necessary to get the desired thickness of the wall of the finished bushing. Thereafter, the hollow cylinder so formed of the wire netting and having a greater outer diameter than the finished bushing, is subjected to considerable pressure, and is heated until a welding or fritting together of the wires occurs, however, to such an extent only, that the interstices or meshes between the wires remain unimpaired or at least not completely filled out by the material of the wires which may become plastic under the application of pressure and heat. The pressing and heating has for a purpose to solidify the hollow cylinder and to bring it into the desired final shape of the bushing. If necessary, the pressing may be repeated or performed in several steps. The pressing and heating may be accomplished in one and the same step of operation or a pressing step may precede the heating step with preferably another pressing step following the heating. It is also possible to apply heat before the pressing. In general, however, I have obtained better results by simultaneously heating and pressing, or by heating after at least some pressure has been exercised.

In order to facilitate the bonding together of the individual wires and of the layers, the wires may be tinned or galvanized or coated with a metal forming an alloy with the material of the wires. In this case, the wires will be soldered or alloyed together by the heat and pressure rather than welded or fritted together. I prefer such soldering or alloying because in doing so it is easier to work at temperatures below the melting temperatures of the wires proper. These melting temperatures should not be reached during the heating step in order to prevent filling out of the pores, interstices or meshes as stated above.

The heating may take place in a neutral atmosphere, that means under cover of a gas which does not react on the metals of the wires and of the bonding substance. I also have found it practical to use high frequency currents sent through the compressed hollow cylinder in order to create the heat for bonding the wires.

If, after the final pressing, additional finishing work is necessary, the bushing may be subjected to any other suitable kind of metal working such as milling, grinding, cutting, or the like. The finished bushing may then be filled or impregnated with a suitable lubricating substance as for instance oil or grease.

The porosity of the bushing according to my invention largely depends upon the size of the meshes of the netting and also on the diameter of the wires. The larger the meshes the greater is the porosity. There appears, however, to be a practical limit because it seems to be advisable to make the meshes so small that a capillary action with respect to the lubricating substance takes place. For the same reason I generally employ very fine wires or metal filaments. I, however, wish to emphasize that the wires or filaments may have any suitable cross-section which may be for instance round, oval, angular, or elongated.

The material of the wires may be chosen in consideration of similar view points as usual in conventional bearings. Therefore, copper wires, bronze wires, iron or steel wires etc. are suitable materials. In many cases, particularly if the bushings in operation are subjected to relatively high pressure, it is advisable to use a compound netting consisting of wires of different hardness for instance a copper wire net into which more or less steel wires are interwoven. Particularly if such compound nettings are employed, I prefer to arrange the wires running at an angle other than 90° to the axis of the bushing in order to prevent unequal wear of the journal pivoted in such bushing since otherwise the harder wire material may cause circumferential grooves in the journal surface.

A bushing according to my invention may be produced in a modified manner by cutting out of a suitable metal wire netting round discs with a hole approximately corresponding to the cross-section of the journal for which the bushing is destined. These discs are then arranged side by side and pressed and heated to form the bushing body in the manner described above. Instead of cutting the holes when the discs are cut out of the wire net, the discs may be made without a hole, and a solid cylinder may be formed thereof by pressing and heating, and thereafter may be bored according to the diameter of the journal for which the bushing is meant.

According to another modification of my invention, a continuous wire is crosswise spooled on a mandrel until a sufficient thickness of layers is obtained. The so formed wire cylinder is then treated under pressure and heat as stated above. In order to obtain a compound bushing similar to that referred to in the description of the compound network, several wires arranged parallel to each other may be spooled cross-wise instead of one wire only. These parallel wires may be for instance one copper wire and one steel wire, or two copper wires and one steel wire or the like. In all other respects, particularly regarding the coating of the wires, the same is valid in relation to these modifications as in relation to the first described method for making bushings according to my invention.

The bushings according to the invention may be manufactured either individually or as a continuous cylinder which is cut into pieces of the desired length of a bushing after the pressing and heating operation.

In order to procure divided bushings, a hollow cylinder may be made according to one of the methods described and cut into halves thereafter. It is also possible to make such halves individually by either employing the first mentioned modification—in this case half-circular discs are cut out of the wire netting and arranged to form a half cylinder—or by cutting out rectangular pieces of wire netting of a suitable size, bending them in the form of a half cylinder and superimposing one upon the other to form a half cylinder of desired thickness. The pressing and heating is then accomplished as described above.

In the accompanying drawing several embodiments of my invention are illustrated by way of example in perspective view.

Fig. 1 shows a bushing according to my invention made of a spirally wound network.

Fig. 2 shows the same bushing on a larger scale.

Fig. 3 shows the bushing made of a continuous wire.

Fig. 4 shows a bushing made by spooling two wires in parallel arrangement.

Fig. 5 shows a bushing made of network discs.

Fig. 6 shows a single disc of the bushing of Fig. 5 and

Fig. 7 shows a divided bushing according to my invention.

In the Figures 2 to 7, the netting, the thickness of the wires and the meshes are shown greatly magnified in comparison to the size of the bushings as generally used, in order to clearly illustrate the invention.

The bushing according to Figures 1 and 2 consists of a strip of a network 1 which has a width equal to the length of the bushing and which is wound to render the necessary thickness of the cylinder wall. The network of this particular example is made of alternating copper wires 2 and steel wires 3. The wires are arranged at an angle other than 90° to the axis a—a of the bushing. The so formed body is consolidated by pressure and heat but is porous due to the meshes 4 of the network. The bushing illustrated in Fig. 3 is made of a single continued wire 5 spooled crosswise to form the desired hollow cylinder.

The bushing according to Figure 4 is made in a similar manner by spooling two wires 6 and 7 which are arranged parallel to each other. Wire 6 may be of a material softer than that of wire 7.

Figure 5 shows a bushing which is made of a number of discs 9 as illustrated in Fig. 6. The discs are cut out of wire net work 8 and are arranged side by side to form the body of the bushing. As in the example of Fig. 1, the body is consolidated by pressure and heat whereby the wires are bonded together either through welding or fritting or soldering or the like without injury to the porosity of the finished bushing.

Figure 7 finally shows a divided bushing or brass consisting of a plurality of layers 10 of wire net work 11 bent and superimposed upon each other to form a hollow cylinder.

In order to make my invention fully clear I state hereafter such dimensions as I prefer in a certain bushing I make for use in electrical machines. The finished bushing in this case has a length of 30 millimeters, an outer diameter of 28 millimeters and an inner diameter of 18 millimeters. The network used for this bushing consists of copper-wires having a diameter of 0.3 millimeters and being coated with tin. There are 30 wires per centimeter in warp and woof. The network is wound on a mandrel having a diameter of 16 millimeters to form a cylinder with an outer diameter of 30 millimeters. After the mandrel has been removed, the cylinder is subjected to a super-pressure of 100 atmospheres and thereafter to a temperature of 700° C. It is then subjected to a final super-pressure of 150 atmospheres which brings it down to the required dimensions. The bushings according to my invention have greater mechanical stability and are easier to make and are more uniformly porous than other porous bushings hitherto known, for instance bushings made of pulverized or granulated material.

Although several embodiments of the invention have been illustrated and described herein, it will be obvious to those skilled in the art, that various modifications may be made in the detail of construction without departing from the principle herewith set forth.

I claim:

1. A bearing bushing having pores of substantially capillary size uniformly dispersed therein and communicating with each other throughout the bushing so as to permit repeated filling of the pores with a lubricant, said bushing consisting of wires crossing each other at definite angles and being wound in several layers, said wires being metallically bonded at their crossings without additional bonding material and consolidated into the shape of the bushing by heat and pressure sufficient to accomplish the metallic bonding, but insufficient to destroy the regularity of the angles of the wires and the porosity of the bushing.

2. A bearing bushing having pores of substantially capillary size uniformly dispersed therein and communicating with each other throughout the bushing so as to permit repeated filling of the pores with a lubricant, said bushing consisting of wires of at least two different materials crossing each other at definite angles and being wound in several layers, one of the wire materials having greater hardness than the other one, said wires being metallically bonded at their crossings without additional bonding material and consolidated into the shape of the bushing by heat and pressure sufficient to accomplish the metallic bonding, but insufficient to destroy the regularity of the angles of the wires and the porosity of the bushing.

3. A bearing bushing having pores of substantially capillary size uniformly dispersed therein and communicating with each other throughout the bushing so as to permit repeated filling of the pores with a lubricant, said bushing consisting of copper wire netting into which wires of a material having greater hardness than copper are interwoven, said netting being wound in several layers, and the wires being metallically bonded at their crossings without additional bonding material and consolidated into the shape of the bushing by heat and pressure sufficient to accomplish the bonding but insufficient to destroy the regularity of the angles of the wire crossings and the porosity of the bushing.

4. A bearing bushing having pores of substantially capillary size uniformly dispersed therein and communicating with each other throughout the bushing so as to permit repeated filling of the pores with a lubricant, said bushing consisting of crosswise spooled wire, the crossings of said wire being metallically bonded together without additional bonding material and said spooled wire being consolidated into the shape of the bushing by heat and pressure sufficient to accomplish the bonding but insufficient to destroy the regularity of the angles of the wire crossings and the porosity of the bushing.

5. A method of making a self-lubricating bushing which consists in spooling a wire crosswise on a mandrel until a hollow cylinder of sufficient wall thickness is formed, subjecting said cylinder to heat and pressure to bond the wire at its crossings and to bring the cylinder into the desired shape of the bushing without destroying the interstices of the wire spool and the regularity of the wire crossings, and filling the interstices with a lubricant 6. A method of making a self-lubricating bushing which consists in spooling two parallel wires on a mandrel until a hollow cylinder of sufficient wall thickness is obtained, said wires being of materials one harder than the other one, subjecting said cylinder to heat and pressure to bond the wires at their crossings and to bring the cylinder into the desired shape of the bushing without destroying the interstices of the wire spool and the regularity of the angles of the wire crossings, and filling the interstices with a lubricant.

VICTOR CURSTÄDT.